C. L. LATHAM AND L. HESTER.
HAND TRUCK BRAKE.
APPLICATION FILED APR. 4, 1919.

1,348,428.

Patented Aug. 3, 1920.

WITNESSES

INVENTOR.
Charles L. Latham
Luther Hester
BY
ATTORNEY.

UNITED STATES PATENT OFFICE.

CHARLES L. LATHAM, OF BERKELEY, AND LUTHER HESTER, OF VALLEJO, CALIFORNIA.

HAND-TRUCK BRAKE.

1,348,428.

Specification of Letters Patent.

Patented Aug. 3, 1920.

Application filed April 4, 1919. Serial No. 287,430.

*To all whom it may concern:*

Be it known that we, CHARLES L. LATHAM and LUTHER HESTER, citizens of the United States, residing at Berkeley, in the county of Alameda and State of California, and Vallejo, in the county of Solano, State of California, respectively, have invented certain new and useful Improvements in Hand-Truck Brakes, of which the following is a specification.

This invention relates in general to hand trucks and has for its principal object the production of efficient brakes therefor.

Another object of this invention is the production of a brake for a hand truck which is constructed to provide a pair of wedges which when applied will jam between the periphery of the wheels of the truck and the supporting surface to hold the wheels against rotation.

Another object of this invention is the production of a hand brake wherein the brake has springs connected thereto and also to the frame of the truck, these springs being arranged so as to hold the wedges of the brakes in binding engagement with the peripheries of the wheels, although when the truck is moved by the operator after the load has been placed thereon the rotation of the wheels forwardly will cause the brake to be released from its braking action and automatically returned to an inoperative position.

A still further object of this invention is the production of a hand truck brake wherein the supporting plates of the wedges are formed integral on the wedges and the wedges themselves are of integral construction since these elements are formed from blank sheets of material.

One practical form of construction and assembly of the present invention will be hereinafter described and is illustrated in the drawing, in which:—

Figure 3:
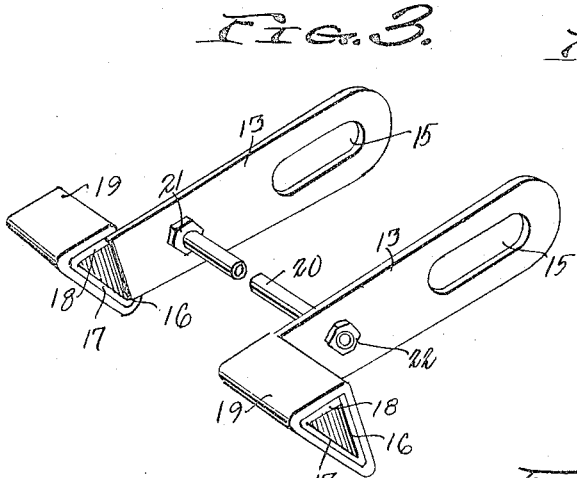
Fig. 3 is a detail perspective view of the brake *per se*, the connecting bar being broken away and the springs being removed.
Figure 5:
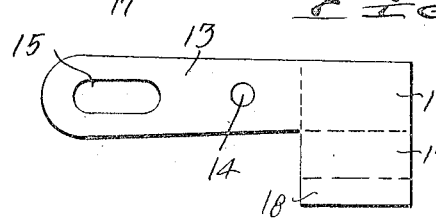
Fig. 5 is a plan view of the blank from which one of the plates and wedges of the brakes are formed.

In the preferred embodiment of the present invention, about to be specifically described, it will be seen that a conventional form of hand truck is shown in general at 10, the frame of the truck being mounted upon the axle 11 having the supporting wheels 12. The brake includes a pair of supporting plates having wedges thereon and for this reason attention is invited to Fig. 5 wherein the sheet of material from which one plate and its wedge are formed is illustrated. The elongated plate 13 is of a flat construction and has an opening 14 intermediate its ends, and is also provided with an elongated slot 15 near its upper end. The plate is bent transversely at one end to provide the top 16 of the wedge which extends at right angles thereto and an extension projecting from the side edge of the blank is bent along the longitudinal edge of the plate 13 to form the base 17 of the wedge, this base extending at an acute angle to the top 16 of the wedge. This base 17 is bent transversely to form a reinforcing flange 18, this flange engaging the under surface of the top 16 of the wedge, adjacent one edge of this top, thus forming a substantially triangular wedge as illustrated in Fig. 3. A sleeve 19 of suitable frictional material is slipped over the wedge as formed to prevent the wedge from slipping when the same is in operation. By referring to Fig. 3 it will be seen that two plates and two wedges are provided for the brakes although the wedges extend outwardly in opposite directions to each other. A hollow rod 20 has its ends passing through the openings 14 in the plates 13 and binding nuts 21 and 22 are carried upon the rod 20 adjacent the head thereof these nuts embracing both the inner and outer surfaces of the plates 13, thus firmly anchoring the plates upon the rod 20 in parallel spaced relation to each other.

In use, the plates 13 engage the outer surfaces of the frame 10 of the hand truck and the axle 11 of the truck passes through the slots 15. Coiled springs 23 are connected to the rod 20 as shown at 24, while the opposite ends of these springs are connected to the frame 10 as shown at 25. It will be noted however, by referring particularly to Fig. 4 that the springs are connected to the frame of the hand truck and to the rod of the brake member, slightly to one side of the axle 11 and therefore the strength of these springs will draw the wedges into a binding engagement with the peripheries of the wheels 12.

Figure 1:
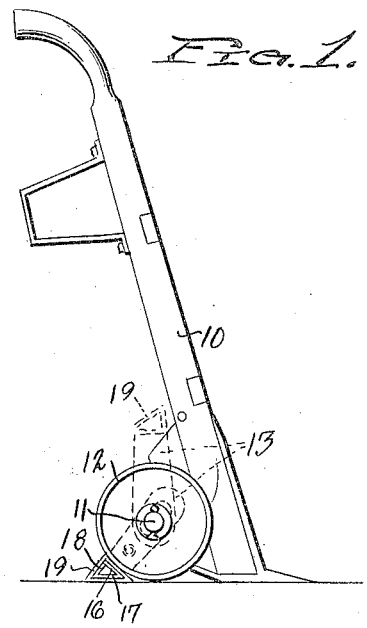
Figure 1 is a side elevation of the hand truck brake in use.

Under normal conditions when the truck is in use, the resilient coil springs 23 will hold the brake in an inoperative position as indicated in dotted lines in Fig. 1. When, however it is desired to place a load upon the truck and the truck is tilted upwardly as shown in Figs. 1 and 2 the brake is applied to prevent the truck from slipping rearwardly as is often the case when a load is being placed thereon.

Figure 2:
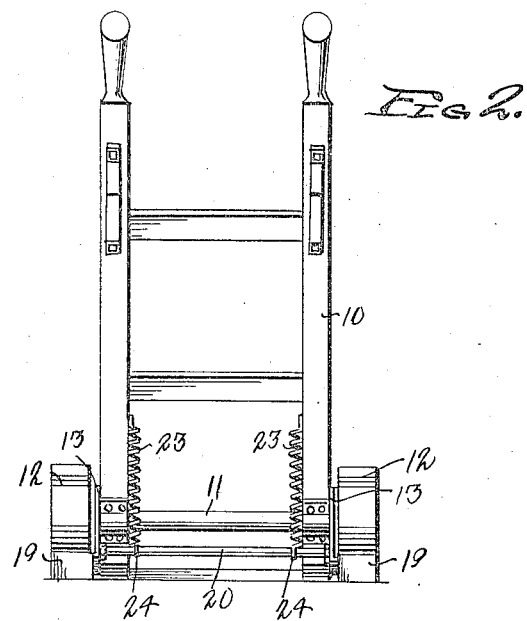
Fig. 2 is a rear elevation of the device in use.
Figure 4:
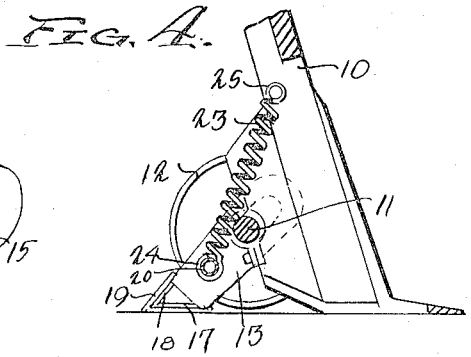
Fig. 4 is a vertical sectional view through the lower portion of the truck, showing the brake applied.

In order to apply the brakes the operator may place his foot upon the rod 20 and thus swing the wedges downwardly in the arc of a circle until they are finally forced between the peripheries of the wheels and the supporting surface carrying the truck as indicated in Figs. 1, 2 and 4. Owing to the provision of the slots 15 in the plates 13, it will be seen that the arms may be used upon trucks having various sized wheels for the resiliency of the coiled springs 23 will draw the wedges toward the fame 10 of the truck thus bringing the wedges into a binding engagement with the peripheries of the wheels 12. Since the sleeves 19 on the wedges are formed of frictional material it is obvious the brakes will be held from accidental displacement and thus their wedging action between the wheels and the supporting surface will cause the wheels to be efficiently braked and prevent the backward movement of the truck when a load is being placed thereon. When however, the load is placed upon the truck and the operator desires to move the truck he merely has to move the truck forwardly thus causing the wheels to rotate forwardly, this action causes the wedges which are being held upon the peripheries of the wheels by the resilient action of the springs, to be swung around as the wheels are rotated and then finally the springs will free the wedges from the wheels and return the brake to an inoperative position which action of course is automatic simply by forward movement of the truck. Special attention is invited to the fact that as the arms and wedges thereof are formed from blank sheets of material, they may be manufactured very easily and at a minimum cost and that after being folded to assembly, possibility of the same becoming injured or out of order when in use is greatly minimized.

It will therefore be seen that a very efficient hand brake has been provided which is very simple in construction. It is normally carried in an inoperative position but simply by engaging the same with sufficient pressure it may be swung around so that the brake wedges between the wheels and supporting surface to brace the wheels against movement. The provision of the elongated slot allows the tension of the springs to draw the wedges into binding engagement with the peripheries of the wheels, however, when the truck is moved forwardly the rotation of the wheels will cause the wedges to be released and then automatically the tension of the coil springs will return the brake to an inoperative position.

The foregoing description and accompanying drawings have reference to what might be considered to be the approved or preferred form of our invention. We desire it to be understood that we may make such changes in the construction, combination and arrangement of parts, materials, dimensions, et cetera, as may prove expedient and fall within the scope of the appended claim.

Having thus fully described our invention what we claim as new and desire to secure by Letters Patent, is:—

A brake to be used as described consisting of a pair of plates having wedges thereon, each plate and the wedge thereof being formed from a blank and being formed by bending one end of the plate at right angles thereto to form the top of the wedge, said plate having an extension projecting to one side thereof, the extension being bent along the edge of said plate to form the base of the wedge, said base then being bent to form a flange for engaging said top adjacent one end thereof, thus forming a triangular wedge, a sleeve of frictional material slipped on said wedge, said plate having elongated slots formed therein adjacent their opposite ends and a reinforcing rod connecting said plates together.

In testimony whereof we affix our signatures in presence of two witnesses.

CHARLES L. LATHAM.
LUTHER HESTER.

Witnesses:
JAMES COAKLEY,
JAMES E. NEWMAN.